United States Patent
Coates

[15] 3,676,364

[45] July 11, 1972

[54] REGENERATION OF NICKEL-ALUMINUM CATALYSTS BY POLYCARBOXYLIC ACID WASHING

[72] Inventor: John Stuart Coates, Houston, Tex.

[73] Assignee: E. I. du Pont de Nemours and Company, Wilmington, Del.

[22] Filed: Sept. 23, 1970

[21] Appl. No.: 74,547

[52] U.S. Cl. .................... 252/413, 252/414, 252/477 Q, 260/635 M
[51] Int. Cl. ..................................... B01j 11/30, B01j 11/02
[58] Field of Search ............ 252/412, 413, 414, 420, 477 Q; 260/635 M

[56] References Cited

UNITED STATES PATENTS

| | | | |
|---|---|---|---|
| 2,908,722 | 10/1959 | Casey | 260/635 M |
| 2,326,275 | 8/1943 | Zeltner | 252/477 Q |
| 3,165,478 | 1/1965 | Hauschild et al. | 252/413 |
| 2,950,260 | 8/1960 | Rosenbaum et al. | 252/477 Q |
| 3,203,905 | 8/1965 | Akabori et al. | 252/430 |

Primary Examiner—Daniel E. Wyman
Assistant Examiner—P. E. Konopka
Attorney—Robert E. Patridge

[57] ABSTRACT

The method of regenerating a granular, foraminous nickel-aluminum catalyst which has been activated by removing about 2–50 percent of the aluminum from a nickel-aluminum alloy originally containing about 25–60 percent by weight of nickel and about 40–75 percent by weight of aluminum and which has lost activity through use as a fixed-bed catalyst in the preparation of butane-1,4-diol by the continuous hydrogenation of an aqueous mixture containing about 30–80 percent by weight of water and diol selected from the group consisting of 2-butyne-1,4-diol and 2-butene-1,4-diol at a temperature of about 60–150°C., a hydrogen pressure of about 100–400 atmospheres and a superficial gas velocity of at least about 0.5 foot per minute which comprises washing the catalyst with a wash medium consisting essentially of about 90–99 percent by weight of water and about 1–10 percent by weight of a polycarboxylic acid selected from the group consisting of citric and succinic acids. Such catalysts can be reactivated by first washing with the above polycarboxylic acid solution and then treating with a dilute aqueous alkali metal hydroxide solution, thereby removing additional aluminum from the alloy. Catalysts which have become fouled through use of an aqueous feed mixture containing dissolved calcium ions can be regenerated by washing the catalyst with the above polycarboxylic acid solution until the wash liquid no longer becomes saturated with calcium ions.

10 Claims, 3 Drawing Figures

FIG. 1

FIG. III

REGENERATION OF NICKEL-ALUMINUM CATALYSTS BY POLYCARBOXYLIC ACID WASHING

BACKGROUND OF THE INVENTION

1. Field of the Invention

This invention relates to the regeneration and reactivation of nickel-aluminum catalysts used in the production of 1,4-butanediol, hereinafter referred to as butanediol, by the hydrogenation of 2-butyne-1,4-diol, hereinafter referred to as butynediol.

2. Description of the Prior Art

In U. S. application, Ser. No. 795,722, filed Jan. 31, 1969 now abandoned, an improved process for the hydrogenation of aqueous butynediol to butanediol is described. This process involves the hydrogenation of an aqueous mixture consisting essentially of about 20–70 percent by weight of butynediol and about 30–80 percent by weight of water at a temperature of about 60°–150°C., a hydrogen pressure of about 2,500–5,500 psi., a superficial gas velocity of at least about 0.5 foot per minute in the presence of a fixed bed of granular, foraminous, nickel-aluminum catalyst which has been activated by removing about 5–30 percent of the aluminum from a nickel-aluminum alloy consisting essentially of about 35–60 percent by weight of nickel and about 40–65 percent by weight of aluminum. Activation of the catalyst is carried out by treating the alloy with a dilute aqueous alkali metal hydroxide solution until the desired amount of aluminum is removed from the alloy.

The hydrogenation process should be carried out so as to convert butynediol to saturated products as completely as possible within practical limits. One of the primary uses for butanediol is in the production of tetrahydrofuran by dehydration as described in U.S. Pat. No. 2,251,835 and German Pat. No. 1,043,342. The presence of intermediate 2-butene-1,4-diol, hereinafter referred to as butenediol, in the hydrogenation product results in the formation of 2,5-dihydrofuran, hereinafter referred to as dihydrofuran, an undesirable impurity in the dehydration product. It is particularly desirable, therefore, that the amount of by-product butenediol be reduced to substantially zero during the hydrogenation. This requires a relatively active hydrogenation catalyst which provides essentially complete hydrogenation.

When substantially fresh catalyst is being used in the hydrogenation, a temperature on the low side of the 60°–150°C. range should be used, and the butenediol content of the product is initially far below the tolerable limit. After the catalyst has been used for an extended period of time, it becomes increasingly less efficient with the result that the butenediol content of the product slowly rises until eventually it reaches the maximum amount that can be tolerated. When this occurs, a major portion of the original efficiency of the catalyst can be restored by increasing the reaction temperature, for example, about 10°C., thereby significantly reducing the butenediol content of the product. After another short period of operation, the butenediol content will again approach the tolerable limit and the temperature will again have to be raised with a similar result. This stepwise raising of the temperature in response to the increase in butenediol in the product can be continued until an exit temperature of about 150°C. is reached. At this point the catalyst is producing an excessive amount of by-products and, heretofore, the catalyst has to be replaced with fresh catalyst if the product is to stay within specifications.

Attempts have been made to reactivate these spent catalysts by treating them with a dilute aqueous alkali metal hydroxide solution in an effort to remove an additional amount of aluminum. However, these attempts have not been successful. The catalyst is apparently fouled in such a manner that further removal of aluminum is not possible. Accordingly, it has become common practice to remove about 20–25 percent of the aluminum in the alloy during the initial activation to provide a catalyst having optimum activity and to discard the catalyst after it has lost all useful activity.

SUMMARY OF THE INVENTION

It has now been discovered that a granular, foraminous nickel-aluminum catalyst, which has been activated by removing about 2–50 percent of the aluminum from a nickel-aluminum alloy containing about 25–60 percent by weight of nickel and about 40–75 percent by weight of aluminum, and which has lost activity through use as a fixed-bed catalyst in the continuous hydrogenation of an aqueous mixture containing about 30–80 percent by weight of water and diol selected from the group consisting of butynediol and butenediol can be regenerated by the process which comprises washing the catalyst with a wash medium consisting essentially of about 90–99 percent by weight water and about 1–10 percent by weight of polycarboxylic acid selected from the group consisting of citric and succinic acids.

In a particular embodiment it has been discovered that nickel-aluminum catalysts which have lost activity through use in the hydrogenation of aqueous mixtures containing butynediol or butenediol can be reactivated by first washing the catalyst with the above wash medium and then treating the acid-washed catalyst with a 0.1–10 percent by weight aqueous alkali metal hydroxide solution thereby removing additional aluminum from the alloy.

In another embodiment of the invention, nickel-aluminum catalysts which have lost activity through use in the hydrogenation of aqueous mixtures containing 1–1,000 parts per million of calcium ions can be regenerated by washing the catalyst with the above wash medium until the wash liquid no longer becomes saturated with calcium ions.

DETAILED DESCRIPTION OF THE INVENTION

The catalyst regeneration process of this invention relates to fixed-bed, granular, foraminous, nickel-aluminum catalysts used in the preparation of butanediol by the continuous hydrogenation of aqueous mixtures containing butynediol or butenediol. The aqueous butynediol mixtures which may be used in the hydrogenation reaction are readily obtained by the well known reaction of acetylene and formaldehyde as described, for example, in U.S. Pats. Nos. 2,840,618; 2,871,273; 2,939,844 and 3,154,589, and in U.S. Pat. application Ser. No. 677,020 to J. R. Kirchner, filed Oct. 23, 1967, now U.S. Pat. No. 3,560,576. The amount of water and butynediol in the product will vary within wide limits, for example, about 30–80 percent by weight of water and about 20–70 percent by weigh of butynediol, depending upon the concentration of the aqueous formaldehyde used in the reaction, and whether or not, and to what extent, the product is concentrated by distillation. Crude butynediol products are conventionally subjected to a thermal separation wherein formaldehyde, some water, and other volatile products are removed and recycled to the reaction.

Preferably the feed material to the hydrogenation reaction contains about 35–60 percent by weight butynediol and about 40–65 percent water, and most preferably about 50–60 percent butynediol and about 40–50 percent water. The feed commonly also contains a minor amount of formaldehyde, but generally less than about 1 percent, and preferably less than about 0.5 percent.

The hydrogenation reaction is generally carried out at a hydrogen partial pressure of about 100–400 atmospheres and a superficial gas velocity of at least about 0.5 foot per minute, measured as the hydrogen leaves the catalyst bed. With hydrogen pressures of less than about 100 atmospheres the hydrogenation reaction is uneconomically slow. Pressures above about 400 atmospheres are not economical because they require special high pressure equipment. There is no upper limit on the gas velocity except that imposed by the requirement that the catalyst be in a fixed bed rather than fluidized. Preferably, the hydrogen partial pressure is about 150–350 atmospheres and the superficial gas velocity is at least about 0.8 foot per minute.

The hydrogenation temperature may vary from about 60°–150b$LC$. When the temperature is less than about 60°C., uneconomically large amounts of catalyst are required to complete the reaction. Since the reaction is exothermic, the temperature measured at the reactor exit will be somewhat higher than at the reactor entrance. The temperature at the reactor exit should not exceed about 150°C. At temperatures above about 150°C., by-produce formation, principally n-butanol, butenediol and high boiling impurities becomes excessive. Preferably the reaction temperature is maintained at about 70°–145°C., and most preferably about 75°–125°C.

The activated nickel-aluminum catalysts used in this process are most active when used under non-acidic conditions. Accordingly, it is preferred that alkali be added to the reactants in sufficient amount to maintain a pH of about 6.5–8 at the reactor exit. The pH is specified "at the reactor exit" because it has been observed that the pH sometimes varies between the reactor feed point and the reactor exit. Control of the Ph may be accomplished by adding alkali to the fresh butynediol feed, by adding alkali to the reactor effluent being recycled, or both. Suitable alkali for this use includes alkali metal hydroxides, such as sodium, potassium and lithium hydroxides, and the like. Most preferably, the pH at the reactor exit is maintained at about 7–7.5.

The hydrogenation may be carried out in a single stage or the process may involve two or more stages. In a preferred embodiment, butynediol is passed to a primary hydrogenation stage employing recycle, and the product of this stage, an aqueous mixture containing butanediol and some butenediol, is passed to a supplemental or secondary hydrogenation stage using the same type of catalyst and conditions, but without recycle, to form a final product which is substantially free of butenediol. In this case it is necessary that the butenediol content of the product of the first stage be maintained low enough that the temperature in the second stage can be controlled during conversion of the remaining butenediol to butanediol without recycle being necessary. Typically the feed to the second stage contains 20–70 percent by weight of butanediol and 1–10,000 parts per million of butenediol.

The hydrogenation process uses a fixed-bed or granular, foraminous, nickel-aluminum catalyst which has been activated by removing about 2–50 percent of the aluminum from a nickel-aluminum alloy containing about 25–60 percent by weight of nickel and about 40–75 percent by weight of aluminum. Such catalysts are described in U.S. Pat. No. 2,950,260. These catalysts, unlike conventional Raney nickel catalysts which have had all of the aluminum removed from the nickel-aluminum alloy, still contain about 50–98 percent of the aluminum in the original alloy. This residual aluminum acts as a support for the nickel and allows the catalyst to retain the granular size characteristics of the original alloy. Such catalysts are suitable for use in a fixed-bed process. Preferably, the original nickel-aluminum alloy contains about 35–45 percent by weight of nickel and about 55–65 percent by weight of aluminum. The terms "activated" and "activation", as used throughout the specification and claims, are intended to refer not only to the original activation of fresh alloy but also to catalyst which has been reactivated after it has lost activity through use. Activation is carried out by contacting the catalyst with an alkali metal hydroxide solution and should be differentiated from "regeneration" which, as used herein, is intended to refer to treatment of the catalyst with aqueous polycarboxylic acid solution.

The initial activation of the catalyst is generally carried out by contacting the alloy with an aqueous alkali metal hydroxide solution until 2–50 percent of the aluminum is leached from the alloy. Generally the alkali metal hydroxide solution will contain about 0.1–5 percent by weight of alkali metal hydroxide. At least about 2 percent of the aluminum in the original alloy should be removed to provide a catalyst of suitable activity. When more than about 50 percent of the aluminum is removed, the mechanical strength of the catalyst particles is reduced such that they are no longer suitable for use in a fixed bed.

The preferred method of activating the catalyst is to treat the alloy with an aqueous alkali metal hydroxide solution in such a manner that the treating solution does not contain any substantial amount of insoluble aluminum hydroxide. This may be accomplished, for example, by feeding the dilute aqueous alkali metal hydroxide solution to the catalyst at a temperature not in excess of 50°C., whereby less than about 1.5 moles of hydrogen are evolved for each mole of alkali metal hydroxide consumed. Preferably the aqueous solution contains about 0.25–1 percent by weight of sodium hydroxide, the exit temperature of the solution during activation does not exceed about 50° C., and about 5–40 percent of the aluminum originally contained in the alloy is leached out.

The granular catalyst particles should have average diameters in the range of about 1.5–25 millimeters. The term "granular" is used herein to define catalysts consisting essentially of particles having average diameters falling within these limits. Preferably the catalyst consists essentially of particles having average diameters of about 2–5 millimeters.

In accordance with this invention a nickel-aluminum catalyst, which has been activated and which has lost activity through use in the hydrogenation reaction, can be regenerated by washing the catalyst with a wash medium consisting essentially of water and about 1 to 10 percent by weight of polycarboxylic acid selected from the group consisting of citric and succinic acids. The term "consisting essentially of", as used throughout the specification and claims, is meant to include only those unspecified ingredients or impurities which do not materially affect the basic and novel characteristics of this invention. In other words, this term excludes unspecified ingredients or impurities in amounts which prevent the advantages of this invention from being realized.

In the case of an optically active polycarboxylic acid such as citric, racemic mixtures may be used. The preferred polycarboxylic acid, for economical reasons, is citric acid. It is preferred that the wash medium contain 2 to 6 percent by weight of citric acid.

The polycarboxylic acid wash step can be carried out in a continuous or a batchwise manner. The duration of the acid wash may vary over wide limits. Most commonly, it is carried out for at least about 2 hours. However, shorter wash periods, for example, as short as about 30 minutes, do lead to a useful result. Preferably the acid wash is carried out for at least about 6 hours and most preferably for at least about 12 hours. There is little advantage in washing for more than about 24 hours.

The polycarboxylic acid wash step should be carried out at a temperature of less than about 40°C. At temperatures above about 40°C., aluminum and nickel removal is excessive. It is preferable that the polycarboxylic acid wash step be carried out at ambient temperature, that is, at room temperature or atmospheric temperature. No pressure is required for the wash step other than the pressure necessary to pump the wash medium through the catalyst bed. After the acid wash, the catalyst should be rinsed with water until the rinse liquid reaches a pH of 6 to 7.

It has been found that catalysts which have been regenerated in accordance with this invention have a rate of activity which is more or less equivalent to the activity of freshly activated catalyst. However, after repeated regeneration of the catalyst with polycarboxylic acid, the catalyst will eventually become inactive, that is, lose its ability to be regenerated by acid washing alone.

In accordance with this invention, it has been discovered that washing spent catalyst with polycarboxylic acid solution removes the resistance of the catalyst to reactivation by treatment with a dilute alkali metal hydroxide solution. Accordingly, catalysts which have been acid washed in accordance with this invention can be reactivated by treating with a dilute caustic solution thereby removing additional aluminum. As previously pointed out, heretofore it has not been possible to reactivate used catalysts of this type by treatment with caustic since further removal of aluminum from the fouled catalyst does not occur. Although it is not intended that this invention be limited to any particular theory, it is believed that these used catalysts contain an aluminum hydroxide gel within their inner pores which is formed through interaction with the aqueous medium under the hydrogenation conditions. It has been found that this gel is removed by the acid treatment of this invention whereby effective reactivation of the catalyst can be accomplished.

When the aqueous butynediol mixture fed to the hydrogenation reaction contains dissolved calcium salts, loss of activity by nickel-aluminum catalysts used in the hydrogenation is a particularly severe problem. In the U.S. Pat. application to J. R. Kirchner cited above, it is taught that a pH of 3 to 10 should be maintained during preparation of aqueous butynediol mixtures by the reaction of acetylene with aqueous formaldehyde in the presence of a copper-acetylide complex. Suitable materials for controlling the pH in that reaction include water-soluble alkaline calcium salts such as calcium hydroxide, calcium carbonate, and the like. A typical aqueous product of that reaction may contain about 200–1,000 parts per million of calcium ion.

It has been found that the use of feed materials containing these dissolved calcium salts leads to short catalyst life in the hydrogenation reaction. Although it is not intended that this invention be limited to any particular theory, it is believed that fouling of these catalysts is due, at least in part, to the deposit of calcium, probably in the form of calcium aluminate, on the surface of the catalyst.

The polycarboxylic acid washing step of this invention has been found to be particularly effective in regenerating the activity of nickel-aluminum catalysts which have become fouled by use in the hydrogenation of aqueous butynediol mixtures containing water-soluble alkaline calcium salts. When catalysts fouled with calcium deposits are washed with the polycarboxylic acid, the rate of removal of calcium ion is initially quite high. However, calcium ion has only limited solubility in the polycarboxylic acid solution, the amount which will actually dissolve depending upon the concentration of polycarboxylic acid in the solution. Accordingly, the solution may become saturated with calcium ion rather rapidly, sometimes within a matter of several minutes, after which further removal of calcium ion does not occur. On the other hand, removal of aluminum and nickel from the catalyst continues to occur after calcium ion removal has essentially stopped. Thus, it is preferable that the wash medium be removed from contact with the catalyst when it has become saturated with calcium ion.

Maximum regeneration of catalysts fouled by calcium deposits is achieved when a series of acid washes is carried out until the wash liquid no longer becomes saturated with calcium ions. This may be accomplished by circulating the acid solution through the catalyst bed while measuring the calcium ion content of the solution. When the calcium ion content reaches the saturation point for that concentration of polycarboxylic acid, the wash solution is drained from the system and a fresh wash solution is circulated in the same manner. This series of washings can be repeated until the effluent wash liquid no longer becomes saturated with calcium ion; that is, until the calcium ion concentration in the wash liquid appears to be leveling off below the saturation point. At this point further washings should be discontinued since they tend to result in the removal of an inordinant amount of aluminum and nickel from the catalyst as compared with the further amount of calcium removed. It is particularly desirable that no more nickel than necessary be removed from the catalyst since this is the active catalyst species. Preferably washing is continued until the calcium ion concentration in the wash liquid levels off below about 500 parts per million and most preferably below about 200 parts per million.

It has also been found that it is not necessary that catalysts fouled with calcium deposits be washed completely free of calcium before they can be reactivated by treatment with a dilute alkali metal hydroxide solution. Exposure of the catalyst to the polycarboxylic acid solution for a short period of time, for example, about 1 to 8 hours, is all that is necessary to make it possible to reactivate the catalyst. Of course, the exact amount of washing necessary to allow reactivation will depend upon the extent to which the catalyst is fouled. The advantage of partial regeneration plus reactivation versus complete regeneration with or without caustic treatment is that a completely active catalyst is obtained without removing any substantial amount of nickel. When the catalyst is washed with polycarboxylic acid until it is completely regenerated, for example, for about 8 to 20 hours, the removal of a significant amount of both nickel and aluminum occurs. On the other hand, the dilute alkali metal hydroxide solution used to reactivate the catalyst removes aluminum without removing any significant amount of nickel. Thus, by carrying out a short washing with polycarboxylic acid solution, followed by reactivation with a dilute alkali metal hydroxide solution, loss of nickel is kept to a minimum.

The concentration of alkali metal hydroxide in the solution used to reactivate the nickel-aluminum catalyst can be somewhat more concentrated than the solution used in the initial activation of the nickel-aluminum alloy. Alkali metal hydroxide concentrations of about 0.1 to 10 percent by weight are suitable. Preferably, the alkali metal hydroxide concentration is about 1 to 6 percent and the reactivation is carried out at a temperature not in excess of about 50°C.

As has already been pointed out, it has heretofore been common practice to remove about 15 to 30 percent of the aluminum in the original alloy during activation of the catalyst. This has provided a catalyst having an optimum combination of properties, such as high activity and high mechanical strength. However, now that a process has been provided, as described herein, for reactivating the catalyst, it is preferable to remove a much smaller amount of aluminum in the initial activation of the alloy, thereby increasing the number of reactivations which the catalyst can undergo. The catalyst can now be reactivated again and again by repeated aluminum removal until loss of mechanical strength becomes a problem. Accordingly, it may be desirable in accordance with this invention to regenerate and reactivate nickel-aluminum catalysts until as much as about 50 percent of the aluminum in the original alloy is removed.

EXAMPLES OF THE INVENTION

The following examples, illustrating the novel process disclosed herein for regenerating and reactivating nickel-aluminum catalysts used in the hydrogenation of butynediol to butanediol, are given without any intention that the invention be limited thereto. All parts and percentages are by weight.

EXAMPLE 1

Figure 1:
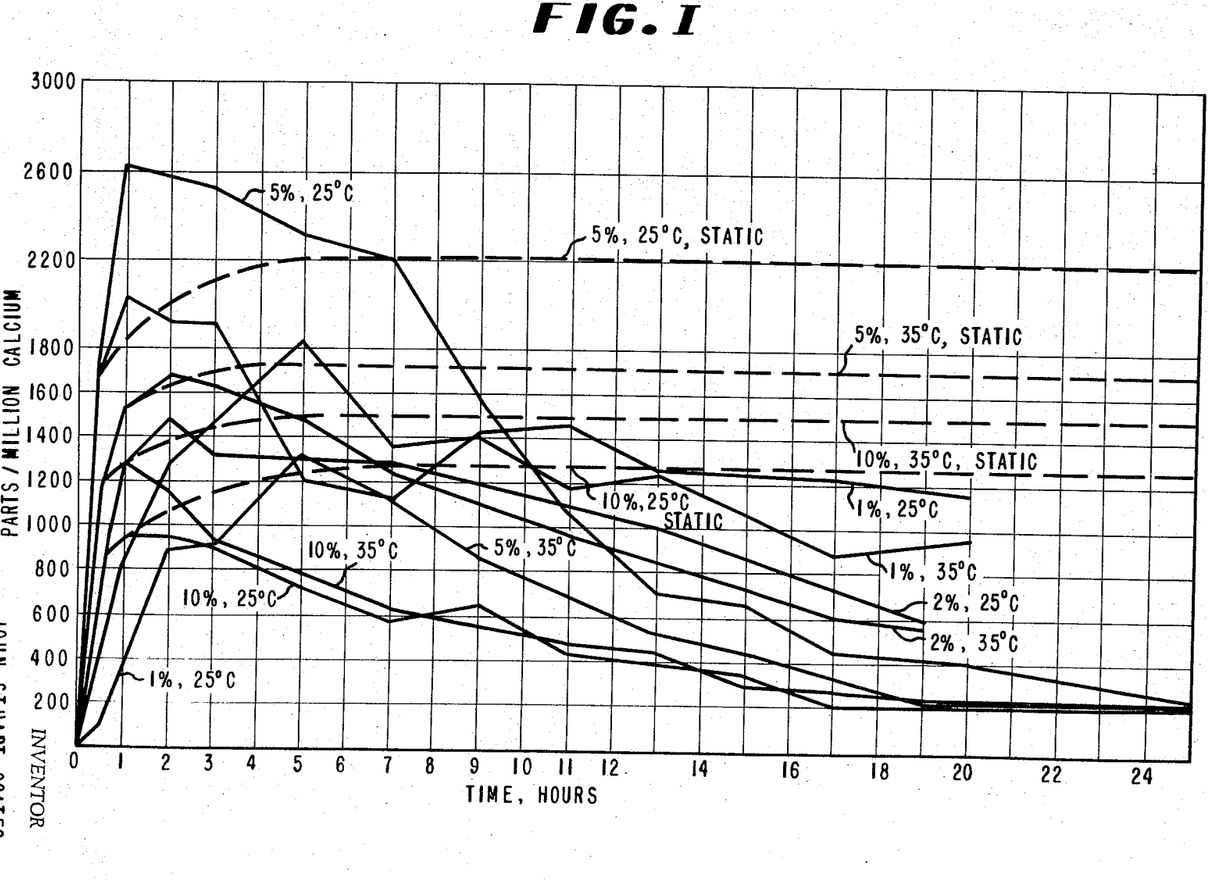
FIG. 1 represents a graph showing the rate of calcium removal from spent nickel-aluminum catalyst upon washing with various concentrations of citric acid at various temperatures.
Figure 2:
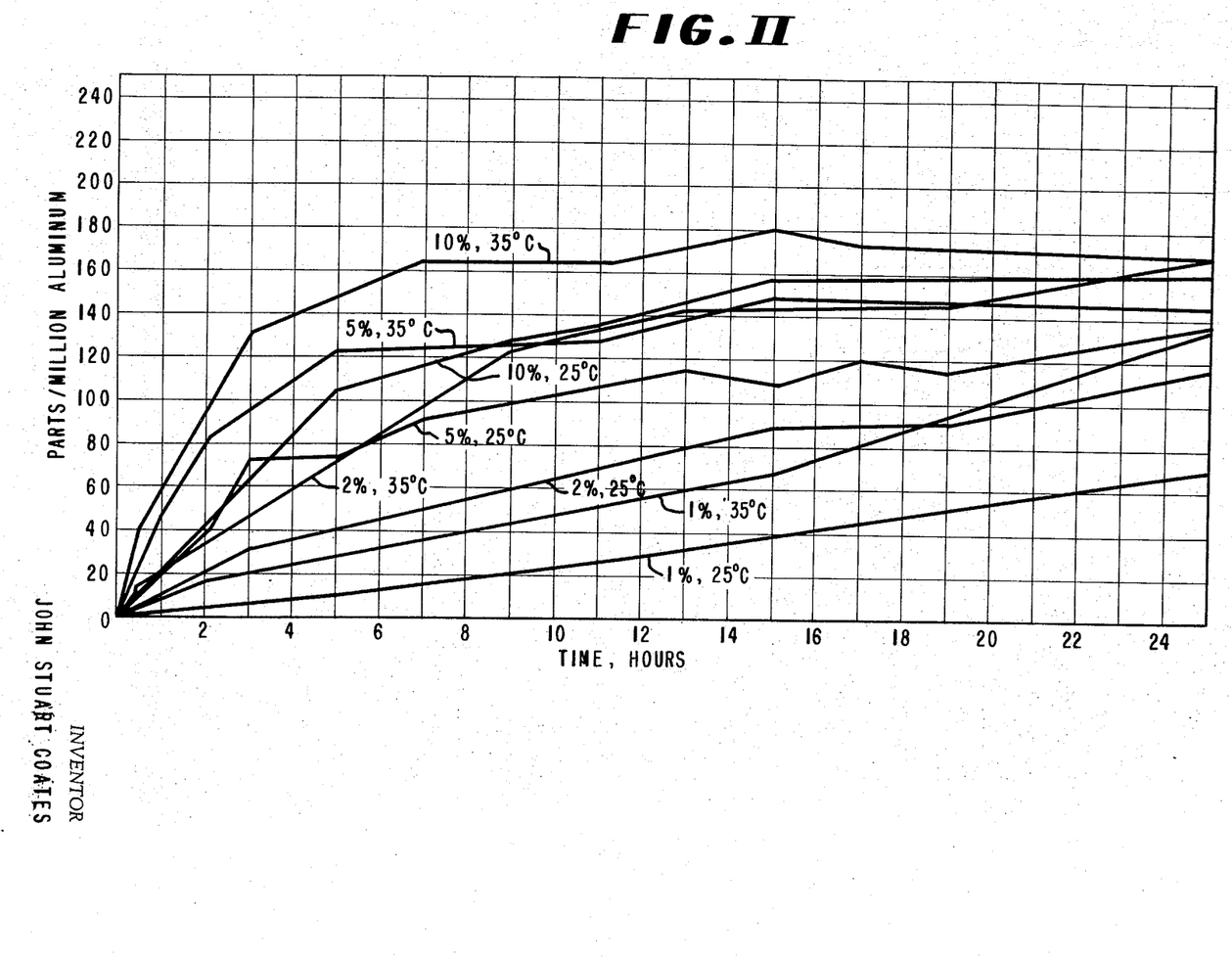
FIG. 2 shows the rate of aluminum removal from spent nickel-aluminum catalyst upon washing with various concentrations of citric acid at various temperatures.
Figure 3:
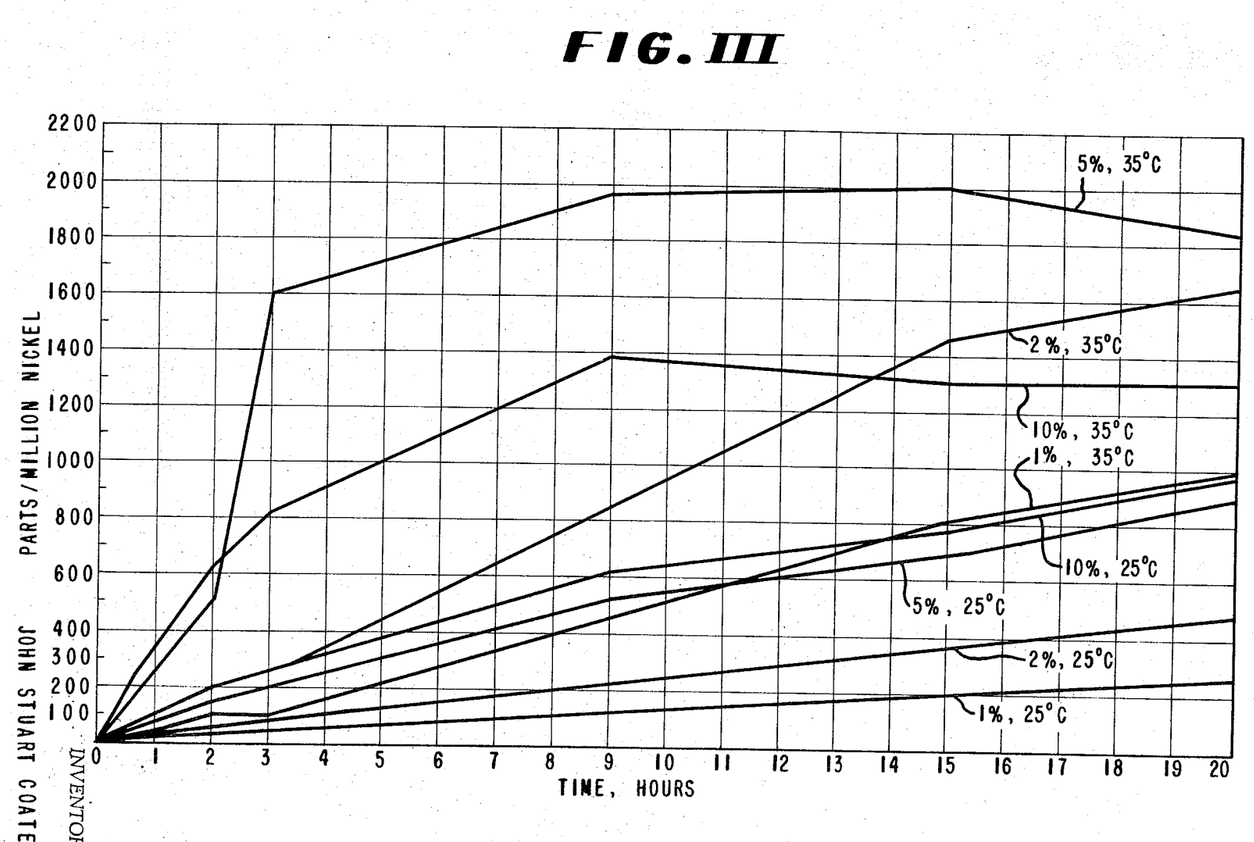
FIG. 3 shows the rate of nickel removal from spent nickel-aluminum catalyst upon washing with various concentrations of citric acid at various temperatures. These graphs resulted from the data obtained in the experiments set forth in Example 1.

70 grams of 4–8 mesh nickel-aluminum catalyst which had been activated by removal of 23.3 percent of the aluminum from an alloy originally containing 42 percent nickel and 58 percent aluminum, and which had been used for 609 hours in the production of 3.15 million pounds of butanediol by the hydrogenation of a feed mixture containing 56 percent butynediol, 43 percent water, 1 percent high boilers and 400–800 parts per million of calcium ion, were placed in 500 ml. of various aqueous solutions containing 1 percent, 2 percent, 5 percent and 10 percent citric acid at 25°C. or 35°C. 50 ml. samples of the acid solution were taken for analysis after 0.5, 1, 2, and 3 hours and every 2 hours thereafter. The volume and acid strength of the solution was then readjusted back to original conditions by the addition of 50 ml. of an aqueous acid solution of suitable concentration. The calcium, aluminum and nickel ion removal data obtained are plotted in FIGS. 1, 2 and 3, respectively. The downward slope of the curves in FIG. 1 represents the dilution effect of the sampling procedure with time.

In the case of 5 percent and 10 percent acid solutions, a limited number of samples were taken under static conditions, that is, with no correction for volume or acid strength, to verify the dilution effect. The results of these static tests are shown in FIG. 1.

EXAMPLES 2–17

20 gram samples of the catalyst described in Example 1 were placed in 500 ml. of various aqueous citric acid solutions of 1 percent, 2 percent and 5 percent concentration at 25° and 35°C. for 25 hours. The catalyst samples were then treated with 1 liter of a 1-percent or 3-percent aqueous sodium hydroxide solution at 25°C. At the end of 3.5 and 5 hours small samples of catalyst and 5 to 10 ml. samples of the caustic solution were taken. Atomic absorption analysis was standardized for 1 percent and 3 percent caustic concentrations and used to determine the aluminum content of the solution from which the percent aluminum removal was calculated. The activity of the catalyst samples was tested by washing the catalyst thoroughly with water and then with dry tetrahydrofuran and placing the sample on facial tissue. A sample which burned holes in the tissue was considered to be pyrophoric and active. Samples which did not burn holes in the tissue were considered to be not pyrophroic and not active.

The data obtained is given in Table I.

TABLE I

| | Citric acid wash | | NaOH wash | | Al removed, percent | Result. |
|---|---|---|---|---|---|---|
| | Conc., percent | Temp., °C. | Conc., percent | Time, hours | | |
| Example: | | | | | | |
| 2 | 1 | 25 | 1 | 3.5 | 1.5 | Not pyrophoric. |
| 3 | 1 | 25 | 1 | 5 | 3.8 | Pyrophoric. |
| 4 | 1 | 25 | 3 | 3.5 | 5.5 | Do. |
| 5 | 1 | 25 | 3 | 5 | 8.6 | Do. |
| 6 | 1 | 35 | 1 | 3.5 | 1.6 | Not pyrophoric. |
| 7 | 1 | 35 | 1 | 5 | 4.7 | Pyrophoric. |
| 8 | 1 | 35 | 3 | 3.5 | 6.5 | Do. |
| 9 | 1 | 35 | 3 | 5 | 10.8 | Do. |
| 10 | 2 | 35 | 1 | 3.5 | 2.0 | Not pyrophoric. |
| 11 | 2 | 35 | 1 | 5 | 2.1 | Pyrophoric. |
| 12 | 2 | 25 | 3 | 3.5 | 7.6 | Do. |
| 13 | 2 | 25 | 3 | 5 | 10.6 | Do. |
| 14 | 5 | 25 | 1 | 3.5 | 1.9 | Not pyrophoric. |
| 15 | 5 | 25 | 1 | 5 | 4.9 | Pyrophoric. |
| 16 | 5 | 25 | 3 | 3.5 | 6.0 | Do. |
| 17 | 5 | 25 | 3 | 5 | 8.6 | Do. |
| Control | 0 | | 3 | 6 | 2.5 | Not pyrophoric. |

EXAMPLE 18

A. 70 grams of wet 4–8 mesh nickel-aluminum catalyst described in Example 1 were added to 500 grams of 5 percent aqueous citric acid solution and allowed to stand for 18 hours at 25°C. After the 18-hour soak, the catalyst was continuously washed with distilled water for 15 minutes. The catalyst was then tested for activity in a batch hydrogenation of butynediol under mild conditions. In this test the activity of the catalyst correlates with the percentage of butenediol intermediate present in the product.

The hydrogenation was carried out by charging a 660 cc. stainless steel shaker tube with 100 grams of 50 percent aqueous butynediol and 10 grams of catalyst. The tube was then sealed and pressurized to 2,100 psig. with hydrogen. Shaking was started and the tube heated to 100°C. As hydrogen was absorbed the pressure dropped. When the pressure reached 1,800 psig. more hydrogen was added to repressurize to 2,100 psig. After a total of 60 minutes at the operating temperature, the tube was cooled and the gas vented. The resulting product was analyzed by gas chromatography and found to contain 84.5 percent butanediol and 0.3 percent butenediol. The remainder of the product was by-products which for the most part would be converted to butanediol under more severe conditions.

B. For comparison, another sample of the same used catalyst, but which had not been washed with citric acid, was tested for activity in the batch hydrogenation of butynediol in a manner similar to the above procedure except as noted. The hydrogenation was carried out at 115°C. When the pressure had dropped to 1,900 psig. the tube was repressurized with hydrogen. When the pressure again dropped to 1,900 psig., the tube was repressurized a second time. The resulting product contained 69.3 percent butanediol and 8.9 percent butenediol.

C. For further comparison, a fresh nickel-aluminum catalyst was tested for activity in the batch hydrogenation of butynediol as before. The catalyst was activated by adding 100 grams of 4–8 mesh nickel-aluminum alloy containing 42 percent nickel and 58 the percent aluminum to 400 grams of water and 0.5 mole of concentrated aqueous sodium hydroxide was added over a 30-minute period. The temperature was maintained at 40°–50°C. during the addition and then at 30°–40C. for an additional 2 hours. The catalyst was then washed with a continuous stream of distilled water for 2 hours. The resulting catalyst had 14 percent of the aluminum in the original alloy removed.

The hydrogenation was carried out in a manner similar to the procedure used in Part A except as noted. The tube was pressurized to only 2,000 psig. and was repressurized twice. The resulting product contained 74.6 percent butanediol and 1.1 percent butenediol.

EXAMPLE 19

Example 18 (A) was repeated except that the catalyst was washed with the citric acid solution for only 6 hours. After being water washed for 15 minutes, 50 grams of the catalyst were treated with 800 grams of 1 percent sodium hydroxide at room temperature for 4 hours. The catalyst was then continuously washed with distilled water for 1 hour.

The hydrogenation was carried out as in Example 18 (A) except as noted. The tube was pressurized to 2,000 psig. and repressurized twice after the pressure dropped to 1,750 psig. The resulting product contained 78.0 percent butanediol and 0.9 percent butenediol.

EXAMPLE 20

A stainless steel reactor having a diameter of 69 inches and an 11-foot high catalyst bed (317 cu. ft.), used as a primary hydrogenation stage, was charged with 34,000 lbs. of 4–8 mesh (0.185–0.093 inch) nickel-aluminum catalyst which had been activated by removal of 24.4 percent of the aluminum from an alloy containing 42 percent nickel and 58 percent aluminum. Activation of the catalyst was accomplished by pumping 0.5 percent aqueous sodium hydroxide up through the reactor at a flow rate of 22 gallons per minute per cubic foot of catalyst on a once-through basis. The hydrogen evolved during the activation was removed from the top of the reactor. The inlet temperature of the caustic feed was 26°C. and the exit temperature averaged approximately 29°C. Activation was accomplished in 9.0 hours with an average aluminum removal rate of 0.045 percent per minute. Caustic utility during the activation averaged approximately 43 percent.

Fresh feed, prepared by reacting 2 moles of aqueous formaldehyde with 1 mole of acetylene, and containing 56 percent butynediol, 43 percent water, 1 percent high boilers and 600 parts per million of calcium ion, was fed to the reactor at the rate of 20.2 lbs. of butynediol per cubic foot of catalyst per hour. The pH of the fresh feed was adjusted with caustic to about 7.3 measured at the reactor exit. Hydrogen was fed to the reactor at a hydrogen partial pressure of 3,800 psi. and a superficial gas velocity of 1 foot per minute, measured as the hydrogen leaves the catalyst bed. With the recycle to fresh feed ratio at 20:1, there was a 22°C. temperature differential within the reactor and product was recovered at the rate of 21.2 lbs. of butanediol per cu. ft. of catalyst per hour. The feed temperature was initially at 75°C.

During operation all conditions were held constant except for the inlet temperature which was increased periodically to maintain the butenediol bleed-through rate at a low level. Periodically during the run the product was analyzed to determine the butenediol content by dehydrating and cyclizing a sample of the product to tetrahydrofuran and determining the amount of dihydrofuran impurity by gas chromatography, measured as parts per million (ppm) based on the total organic content.

After 1,008 hours of operation in which 5.7 million pounds of butanediol were produced, the butenediol bleed-through rate was at 4,600 ppm. The catalyst was then washed with citric acid and reactivated.

The citric acid wash was carried out in four stages. In each stage 2,500 gallons of citric acid solution were circulated through the catalyst bed at the rate of 400 gallons per minute. The four stages of the wash are summarized in Table II.

TABLE II —

First Regeneration

| Wash Stage | Time, min. | Citric Acid Conc., % | ppm in wash | | |
|---|---|---|---|---|---|
| | | | Ca | Al | Ni |
| 1st | 30 | 2.5 | 2,900 | 27 | 125 |
| 1st | 60 | 1.1 | 5,400 | 25 | 150 |
| 1st | 90 | 3.0 | 7,350 | 25 | 200 |
| 1st | 120 | 2.7 | 7,500 | 31 | 550 |
| 2nd | 45 | 5.3 | 5,750 | 26 | 500 |
| 2nd | 75 | 5.1 | 6,800 | 38 | 950 |
| 2nd | 105 | 4.8 | 7,250 | 45 | 1,300 |
| 2nd | 135 | 4.6 | 7,550 | 60 | 1,500 |
| 2nd | 165 | 4.4 | 8,100 | 70 | 1,850 |
| 2nd | 195 | 6.2 | 8,600 | 87 | 2,000 |
| 2nd | 225 | 6.0 | 9,300 | 97 | 2,500 |
| 2nd | 255 | 5.6 | 11,000 | 112 | 2,750 |
| 3rd | 30 | 6.0 | 2,850 | 56 | 1,400 |
| 3rd | 60 | 4.7 | 4,650 | 88 | 2,000 |
| 3rd | 90 | 4.5 | 5,300 | 104 | 2,500 |
| 3rd | 120 | 4.3 | 6,600 | 118 | 3,150 |
| 3rd | 180 | 4.0 | 7,050 | 123 | 4,300 |
| 3rd | 195 | 3.7 | 7,875 | 157 | 6,300 |
| 4th | 30 | 4.9 | 2,150 | 41 | 1,800 |
| 4th | 60 | 4.3 | 2,850 | 73 | 2,350 |
| 4th | 90 | 4.1 | 3,350 | 88 | 3,050 |
| 4th | 120 | 3.9 | 3,400 | 95 | 3,000 |
| 4th | 150 | 3.3 | 3,450 | 107 | 3,550 |
| 4th | 180 | 3.7 | 3,750 | 111 | 4,300 |
| 4th | 195 | 3.6 | 3,800 | 120 | 4,950 |

The total pounds of material removed during the four stages of the acid wash were 625 pounds of calcium, 310 pounds of nickel and 8.6 pounds of aluminum.

The catalyst was then reactivated by washing with sodium hydroxide solution which removed additional aluminum from the catalyst as summarized in Table III. Sodium hydroxide concentration was increased periodically as needed to maintain the reaction rate.

TABLE III —

First Reactivation

| Time | Caustic Conc., % | Al Removed, % |
|---|---|---|
| 15 | 1.09 | 0.2 |
| 30 | 1.09 | 0.4 |
| 60 | 1.08 | 0.5 |
| 90 | 3.02 | 0.8 |
| 120 | 3.00 | 1.0 |
| 150 | 2.98 | 1.4 |
| 180 | 3.50 | 1.5 |
| 210 | 4.34 | 3.7 |
| 240 | 4.30 | 5.5 |
| 270 | 4.27 | 6.0 |
| 300 | 4.22 | 6.5 |
| 330 | 4.21 | 7.0 |
| 360 | 4.27 | 7.4 |
| 390 | 4.68 | 8.0 |
| 405 | 4.66 | 8.1 |

The resulting catalyst, from which 32.5 percent by weight of the original aluminum had now been removed, was water-washed for 12 hours and returned to production of butanediol. This catalyst was used for an additional 583 hours of production during which 3.0 million pounds of butanediol were produced. At this point the butenediol bleed-through rate reached 4,000 ppm. The catalyst was first water washed for 30 minutes and then washed with citric acid in four stages as before, except that there was a 10-minute water wash between the stages of the acid wash. This second acid wash is summarized in Table IV.

TABLE IV —

Second Regeneration

| Stage | Time, min. | Citric Acid Conc., % | ppm Ca in wash |
|---|---|---|---|
| 1st | 15 | 2.7 | 5,200 |
| 1st | 35 | 1.26 | 6,200 |
| 1st | 110 | 4.04 | 5,900 |
| 1st | 140 | 3.83 | 6,050 |
| 2nd | 15 | 4.3 | 2,600 |
| 2nd | 85 | 3.08 | 2,550 |
| 2nd | 115 | 5.96 | 3,400 |
| 2nd | 145 | 5.64 | 4,550 |
| 2nd | 175 | 5.43 | 4,550 |
| 2nd | 205 | 5.28 | 5,000 |
| 2nd | 235 | 5.11 | 4,800 |
| 3rd | 20 | 4.53 | 800 |
| 3rd | 50 | 4.09 | 2,200 |
| 3rd | 80 | 3.94 | 2,800 |
| 3rd | 110 | 4.36 | 3,150 |
| 3rd | 140 | 5.38 | 2,680 |
| 3rd | 170 | 5.21 | 3,200 |
| 4th | 20 | 4.47 | 350 |
| 4th | 45 | 4.2 | 400 |
| 4th | 80 | 5.45 | 500 |
| 4th | 105 | 5.28 | 650 |
| 4th | 135 | 5.17 | 600 |
| 4th | 165 | 4.89 | 620 |
| 4th | 195 | 4.83 | 510 |

The amount of calcium, aluminum and nickel removed during this wash is given in Table V.

TABLE V —

Second Regeneration

| Wash Stage | Pounds Removed | | |
|---|---|---|---|
| | Calcium | Aluminum | Nickel |
| First | 126 | 3.12 | 9.1 |
| Second | 100 | 8.0 | 52.1 |
| Third | 66.6 | 6.8 | 60.6 |
| Fourth | 10.4 | 9.37 | 97.3 |
| Total | 303 | 27.29 | 219.1 |

The catalyst was then water washed for 50 minutes and returned to service.

Before the catalyst was removed from the primary hydrogenation reactor it was regenerated on eight more occasions. Some of these were four-stage washes and some were three-stage, each stage lasting about 4.5 hours. After each of the last two regenerations, the catalyst was reactivated by removing additional aluminum using 1–5 percent sodium hydroxide solution. Table VI summarizes the pounds of calcium removed during each regeneration, the total percent of the original aluminum removed, and the hours operated along with the pounds of butanediol produced between each regeneration.

TABLE VI — THIRD TO TENTH REGENERATION

Following the 2nd regeneration:
  Hours operated — 553
  Pounds of butanediol produced — 2.62 million
  Butenediol bleed-through prior to 3rd regeneration — 8,000 ppm
3rd regeneration:
  Pounds of calcium removed — 152
  Total percent of the original aluminum removed — 32.5 percent
Following the 3rd regeneration:
  Hours operated — 530
  Pounds of butanediol produced — 2.71 million
  Butenediol bleed-through prior to 4th regeneration — 8,500 ppm
4th regeneration:
  Pounds of calcium removed — 254
  Total percent of the original aluminum removed — 32.5 percent
Following the 4th regeneration:
  Hours operated — 300
  Pounds of butanediol produced — 1.53 million
  Butenediol bleed-through prior to 5th regeneration — 5,300 ppm
5th regeneration:
  Pounds of calcium removed — 228
  Total percent of the original aluminum removed — 32.5 percent
Following the 5th regeneration:
  Hours operated — 717
  Pounds of butanediol produced — 3.98 million
  Butenediol bleed-through prior to 6th regeneration — 10,000 ppm+
6th regeneration:
  Pounds of calcium removed — 226
  Total percent of the original aluminum removed — 32.5 percent
Following the 6th regeneration:
  Hours operated — 206
  Pounds of butanediol produced — 1.34 million
  Butenediol bleed-through prior to 7th regeneration — 950 ppm
7th regeneration:
  Pounds of calcium removed — 82
  Total percent of the original aluminum removed — 32.5 percent
Following the 7th regeneration:
  Hours operated — 391
  Pounds of butanediol produced — 2.25 million
  Butenediol bleed-through prior to 8th regeneration — 15,800 ppm
8th regeneration:
  Pounds of calcium removed — 93
  Total percent of the original aluminum removed — 32.5 percent
Following the 8th regeneration:
  Hours operated — 250
  Pounds of butanediol produced — 1.38 million
  Butenediol bleed-through prior to 9th regeneration — 6,100 ppm
9th regeneration and reactivation:
  Pounds of calcium removed — 76
  Total percent of the original aluminum removed — 38.2 percent
Following the 9th regeneration:
  Hours operated — 86
  Pounds of butanediol produced — 0.57 million
  Butenediol bleed-through prior to 10th regeneration — 7,400 ppm
10th regeneration and reactivation:
  Pounds of calcium removed — 104
  Total percent of the original aluminum removed — 44.4 percent
From the 10th regeneration until replacement of the catalyst:
  Hours operated — 88
  Pounds of butanediol produced — 0.48 million
  Butenediol bleed-through prior to replacement — 2,100 ppm During the life of the catalyst in the primary hydrogenation reactor it operated for a total of 4,712 hours during which it produced 25.56 million pounds of butanediol.

EXAMPLE 21

A stainless steel secondary hydrogenation stage reactor having a diameter of 69 inches and an 11-foot high catalyst bed (294 cu. ft.) was charged with 31,400 pounds of 4–8 mesh (0.185–0.093 inch) nickel-aluminum catalyst. During the original activation of this catalyst 23.6 percent by weight of the aluminum in the original alloy, which contained 42 percent nickel and 58 percent aluminum, was removed.

The feed to the secondary hydrogenation stage contained 57 percent butanediol, 43 percent water, from 1–7,000 ppm butenediol and 400 ppm of calcium ion. After 1,565 hours of operation, in which 13.2 million pounds of butanediol were produced, the butenediol bleed-through rate reached 100 ppm, the maximum permissible amount in the secondary stage reactor, after which the catalyst was washed with citric acid.

The citric acid wash was carried out in four stages during each of which 2,500 gallons of citric acid solution was circulated through the catalyst bed at the rate of 400 gallons per minute. The data obtained in the four stages of the wash are summarized in Table VII.

TABLE VII —

First Regeneration

| Wash Stage | Time, min. | Citric Acid Conc., % | ppm in wash | | |
|---|---|---|---|---|---|
| | | | Ca | Al | Ni |
| 1st | 60 | 1.53 | 6,600 | 39 | 96 |
| 1st | 120 | 2.28 | 10,600 | 148 | 320 |
| 1st | 180 | 2.85 | 10,300 | 300 | 380 |
| 1st | 210 | 4.02 | 10,800 | 410 | 270 |
| 1st | 240 | 3.74 | 10,800 | 480 | 340 |
| 1st | 300 | 3.68 | 10,800 | 470 | 370 |
| 1st | 360 | 3.59 | 10,600 | 400 | 350 |
| 1st | 435 | 3.19 | 9,800 | — | — |
| 2nd | Initial | 0.1 | 280 | 32 | — |
| 2nd | 45 | 2.83 | 3,600 | 60 | 370 |
| 2nd | 60 | 3.28 | 5,000 | 90 | 460 |
| 2nd | 90 | 4.46 | 7,700 | 170 | 340 |
| 2nd | 120 | 4.04 | 8,760 | 220 | 500 |
| 2nd | 180 | 3.66 | 9,500 | 340 | 820 |
| 2nd | 210 | 3.39 | 8,960 | 350 | 850 |
| 2nd | 240 | 4.0 | 9,460 | 430 | 1,180 |
| 2nd | 270 | 3.8 | 9,500 | 480 | 1,400 |
| 2nd | 285 | 3.66 | 9,800 | 490 | 1,500 |
| 3rd | Initial | — | 340 | 29 | 32.5 |
| 3rd | 30 | 3.36 | 3,000 | 100 | 440 |
| 3rd | 60 | 3.05 | 5,220 | 145 | 770 |
| 3rd | 90 | 2.76 | 5,510 | 200 | 1,070 |
| 3rd | 120 | 2.81 | 6,800 | 210 | 1,400 |
| 3rd | 150 | 2.38 | 4,900 | 235 | 1,570 |
| 3rd | 170 | 2.34 | 5,400 | 240 | 1,780 |
| 3rd | 195 | 2.27 | 6,200 | 262 | 1,730 |
| 4th | 15 | 3.36 | 1,900 | 48 | 380 |
| 4th | 30 | 3.02 | 3,000 | 68 | 510 |
| 4th | 60 | 2.7 | 4,500 | 120 | 1,670 |
| 4th | 90 | 2.58 | 4,950 | 140 | 1,070 |
| 4th | 120 | 2.34 | 5,500 | 165 | 1,420 |
| 4th | 150 | 2.34 | 5,600 | 167 | 1,900 |

The total pounds of material removed during the four stages of acid wash were 790 pounds of calcium, 137 pounds of nickel and 35 pounds of aluminum.

The catalyst was then reactivated by washing with sodium hydroxide solution to remove additional aluminum. The sodium hydroxide concentration was increased from 1.14 percent to 3.46 percent during the reactivation to maintain the reactivation rate. 1,660 pounds of aluminum or an additional 8.9 percent of the original aluminum was removed in 7 hours and 45 minutes to bring the total percent aluminum removed to 32.5 percent by weight of the original aluminum. The catalyst was then washed with water for 8 hours.

The resulting catalyst was returned to service and operated an additional 4,209 hours during which 41.2 million pounds of butanediol were produced. At that time, the butenediol bleed-through was again near the maximum permissible limit of 100 ppm, so the catalyst was again citric acid washed.

The citric acid wash was carried out in four stages during each of which 2,500 gallons of citric acid solution were circulated through the catalyst bed at the rate of 400 gallons per minute. The data obtained during these four washes is summarized in Table VIII.

TABLE VIII

Second Regeneration

| Length of Wash, Hrs. | Calcium ppm | Citric Acid Conc., % |
|---|---|---|
| 1st wash 4.5 | 200 | None Detected |
| 2nd wash 4.5 | 4,580 | 0.59 |
| 3rd wash 4.5 | 4,920 | 0.68 |
| 4th wash 4.5 | 4,560 | 2.17 |

The total pounds of calcium removed during the four acid washes were 297 pounds.

The resulting catalyst was then returned to service and operated an additional 839 hours during which 10 million pounds of butanediol were produced. At that time the butenediol bleed-through again reached 100 ppm. The catalyst was once again washed, this time with five washes, during each of which 2,500 gallons of citric acid solution was circulated at 400 gallons per minute. The data obtained during these five washes is summarized in Table IX.

TABLE IX —

Third Regeneration

| Length of Wash, Hrs. | Calcium ppm | Citric Acid Conc., % |
|---|---|---|
| 1st wash 4.5 | 3,370 | 1.23 |
| 2nd wash 4.5 | 6,000 | Not analyzed |
| 3rd wash 4.5 | 3,220 | Not analyzed |
| 4th wash 4.5 | 1,850 | 5.41 |
| 5th wash 4.5 | 3,850 | Not analyzed |

The total pounds of calcium removed during the five washes were 370 pounds.

Shortly after returning the catalyst to service the alkaline agent used to control pH in the reaction of formaldehyde and acetylene to form the butynediol feed to the primary hydrogenation reactor was switched from calcium carbonate to sodium carbonate. Accordingly, the calcium ion content of the feed to the secondary hydrogenation stage became negligable. After operating an additional 2,170 hours in which an additional 23.1 million pounds of butanediol were produced, for a total of 8,783 hours of operation and 87.5 million pounds of butanediol, the catalyst was still performing in a satisfactory manner and showed no signs of needing regeneration.

EXAMPLE 22

Example 1 was repeated except that 70 grams of the catalyst were placed in 500 ml. of a 5 percent aqueous succinic acid solution at 25°C. 50 ml. samples were taken for analysis after 1, 2, 4, 9, 12, and 24 hours. The samples were taken under static conditions, that is, with no additional acid added to correct for volume or acid strength. The results of these tests are shown in Table X.

TABLE X —

Succinic Acid Wash

| Wash time, hrs. | ppm in wash Ca | Ni | Al |
|---|---|---|---|
| 1 | 2125 | 100 | 17 |
| 2 | 2175 | 150 | 25 |
| 4 | 2210 | 240 | 42 |
| 9 | 2405 | 395 | 65 |
| 12 | 2500 | 500 | 86 |
| 24 | 2725 | 800 | 123 |

The 70 gram sample washed with succinic acid was then treated with 1 liter of a 3.0 percent aqueous sodium hydroxide solution at 25°C. At the end of 1, 3, 5, and 10 hours, small samples of catalyst and 5–10 mls. of the caustic solution were taken for analysis. Atomic absorption analysis was standardized for 3 percent caustic and used to determine the aluminum content of the solution from which the percent aluminum removal was calculated. The activity of the catalyst samples was tested by washing the catalyst thoroughly with water and then with dry tetrahydrofuran and placing the sample on facial tissue. The data obtained is given in Table XI.

TABLE XI

| NaOH Wash time, hrs. | ppm Al in Wash | Pyrophoric |
|---|---|---|
| 1 | 350 | warm |
| 3 | 1950 | Yes |
| 5 | 4650 | Yes |
| 10 | 8500 | Yes |

Although the invention has been described and exemplified by way of specific embodiments, it is not intended that it be limited thereto. As will be apparent to those skilled in the art, numerous modifications and variations of these embodiments can be made without departing from the spirit of the invention or the scope of the following claims.

The embodiments of the invention in which an exclusive property or privilege is claimed are defined as follows 1. The method of regenerating a granular, foraminous nickel-aluminum catalyst which has been activated by removing 2–50 percent of the aluminum from a nickel-aluminum alloy originally containing 25–60 percent by weight of nickel and 40–75 percent by weight of aluminum and which has lost its activity through use as a fixed-bed catalyst in the preparation of butanediol by the continuous hydrogenation of an aqueous mixture containing 30–80 percent by weight of water and diol selected from the group consisting of butynediol and butenediol which comprises washing the catalyst for at least 1 hour with a wash medium consisting essentially of 90–99 percent by weight of water and 1–10 percent by weight of polycarboxylic acid selected from the group consisting of citric and succinic acids.

2. The method of claim 1 in which the catalyst is first washed with polycarboxylic acid for at least 6 hours at a temperature of less than 40°C., and then is reactivated by treating with a 0.1–10 percent by weight aqueous alkali metal hydroxide solution at a temperature not in excess of 50°C., thereby removing an additional amount of aluminum from the alloy.

3. The method of claim 2 in which the hydrogenation is carried out at a temperature of 60°–150°C. under a hydrogen partial pressure of 100–400 atmospheres and a superficial gas velocity of at least 0.5 foot per minute, measured as the hydrogen leaves the catalyst bed.

4. The method of claim 3 in which the aqueous mixture fed to the hydrogenation reaction contains 20–70 percent by weight of butynediol and 30–80 percent by weight of water and the pH of the hydrogenation reaction medium is adjusted so as to maintain a pH of 6.5–8 at the reactor exit.

5. The method of claim 3 in which the wash medium contains 2–6 percent by weight of citric acid.

6. The method of claim 5 in which the aqueous mixture fed to the hydrogenation reaction contains 35–65 percent by weight of butynediol an 40–65 percent by weight of water 7. The method of claim 6 in which the catalyst is washed for at least 12 hours with citric acid at ambient temperature.

8. The method of claim 7 in which the alkali metal hydroxide solution is a 1–5 percent by weight aqueous sodium hydroxide solution.

9. The method of claim 1 in which the aqueous mixture fed to the hydrogenation reaction contains 1–1,000 parts per million of calcium ions, and the acid wash is carried out at a temperature of less than 40°C. by a series of washings which are continued until the wash liquid no longer becomes saturated with calcium ions.

10. The method of claim 9 in which the acid wash is carried out using a 2–6 percent by weight citric acid solution at ambient temperature and is continued until the calcium ion concentration in the wash liquid levels off below about 500 parts per million.

* * * * *